UNITED STATES PATENT OFFICE.

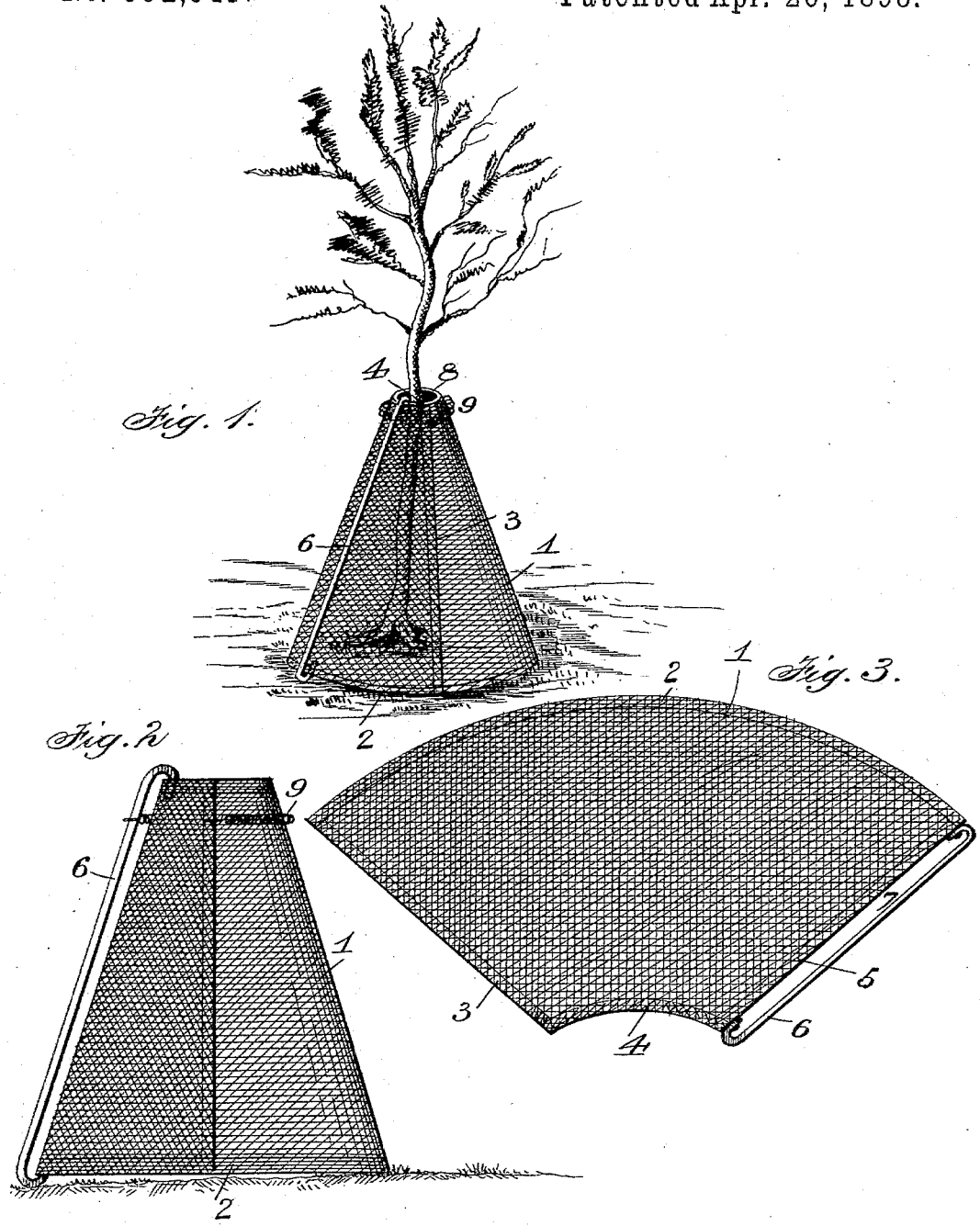

JOHN A. HARVEY, OF HANCOCK, MARYLAND.

PROTECTOR FOR TREES.

SPECIFICATION forming part of Letters Patent No. 602,941, dated April 26, 1898.

Application filed April 14, 1897. Serial No. 632,113. (No model.)

*To all whom it may concern:*

Be it known that I, JOHN A. HARVEY, a citizen of the United States, residing at Hancock, in the county of Washington and State of Maryland, have invented certain new and useful Improvements in Protectors or Guards for Trees, &c.; and I do hereby declare the following to be a full, clear, and exact description of the invention, such as will enable others skilled in the art to which it appertains to make and use the same.

The object of my invention is to afford means for the protection of fruit and other trees and also shrubbery, grape-vines, &c., from the ravages of small animals and injurious insects of all kinds.

It is well known that what is popularly termed the "borer" is a noxious insect whose larvæ eat their way into soft wood, forming at the bottom of the holes a little cocoon, whence they emerge as small beetles. There is also the grape-vine borer or moth, which lays its eggs in July and August at the base of the grape-vine close to the ground. From these emerge the grape-vine borers. Rats and mice and other vermin are also very destructive to the growth and life of fruit and other useful and ornamental trees, as well as vines and shrubs.

It is the purpose of my invention to afford full and ample protection to all varieties of useful and ornamental growths, whether large or small. I attain these objects by the means illustrated in the accompanying drawings, in which—

Figure 1 is a perspective view of the guard applied to a tree. Fig. 2 is perspective view of my guard, and Fig. 3 is a plan view of the blank from which the guard is made.

Similar numerals refer to similar parts throughout the several views.

1 represents my protector, which is composed of a sheet or length of wire or other perforated fabric having its edges 2, 3, 4, and 5 overlaid, as shown, thereby forming a strengthening-band. The top and bottom edges may, however, be left ragged, if desired.

6 is a rod curved at its ends, to which is attached one end of the guard, (see Fig. 3,) so as to form a narrow space 7.

8 represents a layer of cotton or other suitable material, which may be attached to the inner top part of the guard or may be placed around the tree at the proper height, as is deemed best. This will prevent injury to the tree when agitated by the wind or from any other source. The cotton may carry or be saturated with an insecticide or tar to kill or prevent the ascent of any insect which might emerge from the ground or the trunk of the tree. A spiral spring 9 or other elastic device is attached to the upper part of the guard, which may be hooked into any perforation in order to bring said part sufficiently tight around the tree to prevent the ascent of any insect which may have burrowed in the ground or in any part of the inclosed trunk. Additional springs may be employed, if desired, to keep the parts in close contact when the guard is in place.

My protector is applied by wrapping it around the part to be protected and then inserting one end in the narrow space 7, in which it is free to move. The top is then brought tightly around the trunk and is secured and held in position by the spring 9, while the bottom is larger, as shown, the whole device thus forming a cone-shaped guard or protector.

The spiral spring 9 will allow the top of the guard to expand as the tree grows and at the same time will keep it in close contact with the trunk.

The bottom of the guard resting on the ground can be made larger or smaller, as may be desired, since the end easily slips back and forth in the narrow space 7. If thought best, a separate strengthening-band might bind the edges, but it is thought that the overlapping of the edges, as shown at 2 and 3, will be sufficient.

It will be seen that small animals and injurious insects will be prevented from injuring the trunk of the tree from the outside, and should any emerge from the roots or the inclosed trunk they would be prevented from ascending.

It is evident that my guard may be made of any size and height.

What I claim, and desire to secure by Letters Patent, is—

1. A tree or vine guard consisting of a wire fabric having a rod at one end, said rod being in contact with the fabric at its end only and forming a narrow space between the rod and the fabric, as set forth.

2. A tree or vine protector consisting of a wire fabric having a rod at one end, said rod having curved ends whereby a narrow space is formed for the insertion of the fabric, and a spring to fasten the parts together, as set forth.

3. A tree or vine protector consisting of a wire fabric having overlaid edges, a rod with curved ends fastened to one end of the fabric, and a spring to fasten the parts together, as set forth.

4. A tree or vine guard provided with a rod 6 having curved ends, said rod being fastened to one end of the fabric of which the guard is composed, a layer of cotton or similar material on its upper part carrying an insecticide, and adjusting-springs, as set forth.

In testimony whereof I affix my signature in presence of two witnesses.

JOHN A. HARVEY.

Witnesses:
WILLIAM FAITH,
R. M. WILKINSON.